US012580380B2

(12) United States Patent　　　　　(10) Patent No.:　US 12,580,380 B2

Shankar　　　　　　　　　　　　　　　(45) Date of Patent:　　Mar. 17, 2026

(54) METHODS AND APPARATUS TO PROTECT TRANSISTORS USING VOLTAGE CLAMP CIRCUITRY

(71) Applicant: Texas Instruments Incorporated, Dallas, TX (US)

(72) Inventor: Ganapathi Shankar, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 235 days.

(21) Appl. No.: 18/204,276

(22) Filed: May 31, 2023

(65) Prior Publication Data

US 2024/0291266 A1　　Aug. 29, 2024

(30) Foreign Application Priority Data

Feb. 27, 2023　(IN) ............................. 202341013108

(51) Int. Cl.
　*H02H 7/20*　　　(2006.01)
　*H03K 17/082*　　(2006.01)
　*H02M 1/34*　　　(2007.01)
(52) U.S. Cl.
　CPC .............. *H02H 7/205* (2013.01); *H02M 1/34* (2013.01)
(58) Field of Classification Search
　CPC ............. H02H 7/205; H03K 17/08122; H03K 17/0822; H02M 1/34–348
　See application file for complete search history.

(56) References Cited

U.S. PATENT DOCUMENTS

| | | | | |
|---|---|---|---|---|
| 11,038,502 | B1 * | 6/2021 | Xie | H02M 1/08 |
| 11,641,198 | B1 * | 5/2023 | Hashim | H03K 17/163 |
| | | | | 327/109 |
| 11,996,847 | B1 * | 5/2024 | Kazama | H03K 17/0822 |
| 2023/0246640 | A1 * | 8/2023 | Hashim | H03K 17/163 |
| | | | | 327/109 |
| 2024/0204765 | A1 * | 6/2024 | Dake | H03K 17/08122 |
| 2025/0112629 | A1 * | 4/2025 | Kim | H03K 17/08122 |

FOREIGN PATENT DOCUMENTS

WO　　WO-2024261949 A1 * 12/2024

* cited by examiner

*Primary Examiner* — Sisay G Tiku
(74) *Attorney, Agent, or Firm* — Xianghui Huang; Frank D. Cimino

(57)　　　　　　ABSTRACT

An example apparatus includes: a transistor having a source, a drain, and a gate; first voltage clamp circuitry having a first terminal, a second terminal, and a third terminal, the first terminal of the first voltage clamp circuitry coupled to the source of the transistor, the second terminal of the first voltage clamp circuitry coupled to the gate of the transistor; second voltage clamp circuitry having a first terminal, a second terminal, a third terminal, and a fourth terminal, the first terminal of the second voltage clamp circuitry coupled to the drain of the transistor, the second terminal of the second voltage clamp circuitry coupled to the gate of the transistor, the third terminal of the second voltage clamp circuitry coupled to the source of the transistor; and clamp control circuitry having a first terminal, a second terminal, a third terminal, and a fourth terminal.

20 Claims, 6 Drawing Sheets

METHODS AND APPARATUS TO PROTECT TRANSISTORS USING VOLTAGE CLAMP CIRCUITRY

CROSS-REFERENCE TO RELATED APPLICATION

This patent application claims the benefit of and priority to IN Provisional Patent Application No. 202341013108 filed Feb. 27, 2023, which Application is hereby incorporated herein by reference in its entirety.

TECHNICAL FIELD

This description relates generally to voltage clamp circuitry, and more particularly to methods and apparatus to protect transistors using voltage clamp circuitry.

BACKGROUND

As electronic manufacturing technologies continue to advance, transistors have become capable of safely operating across an increasingly wide range of voltages. Transistors have a safe operating area, which defines the range of voltages that can be safely applied to terminals of a transistor. The safe operation area characterizes voltage differences between a drain terminal and a source terminal, for a corresponding gate voltage. Applying voltages to terminals of a transistor according to the safe operation area allows the transistor to continue to operate as designed (e.g., intended). Applying voltages to terminals of a transistor that are not characterized by the safe operating area could result in permanent damage to the transistor.

SUMMARY

For methods and apparatus to protect transistors using voltage clamp circuitry, an example apparatus includes An example apparatus includes: a transistor having a source, a drain, and a gate; first voltage clamp circuitry having a first terminal, a second terminal, and a third terminal, the first terminal of the first voltage clamp circuitry coupled to the source of the transistor, the second terminal of the first voltage clamp circuitry coupled to the gate of the transistor; second voltage clamp circuitry having a first terminal, a second terminal, a third terminal, and a fourth terminal, the first terminal of the second voltage clamp circuitry coupled to the drain of the transistor, the second terminal of the second voltage clamp circuitry coupled to the gate of the transistor, the third terminal of the second voltage clamp circuitry coupled to the source of the transistor; and clamp control circuitry having a first terminal, a second terminal, a third terminal, and a fourth terminal, the first terminal of the clamp control circuitry coupled to the gate of the transistor, the second terminal of the clamp control circuitry coupled to the source of the transistor, the third terminal of the clamp control circuitry coupled to the third terminal of the first voltage clamp circuitry, the fourth terminal of the clamp control circuitry coupled to the fourth terminal of the second voltage clamp circuitry.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
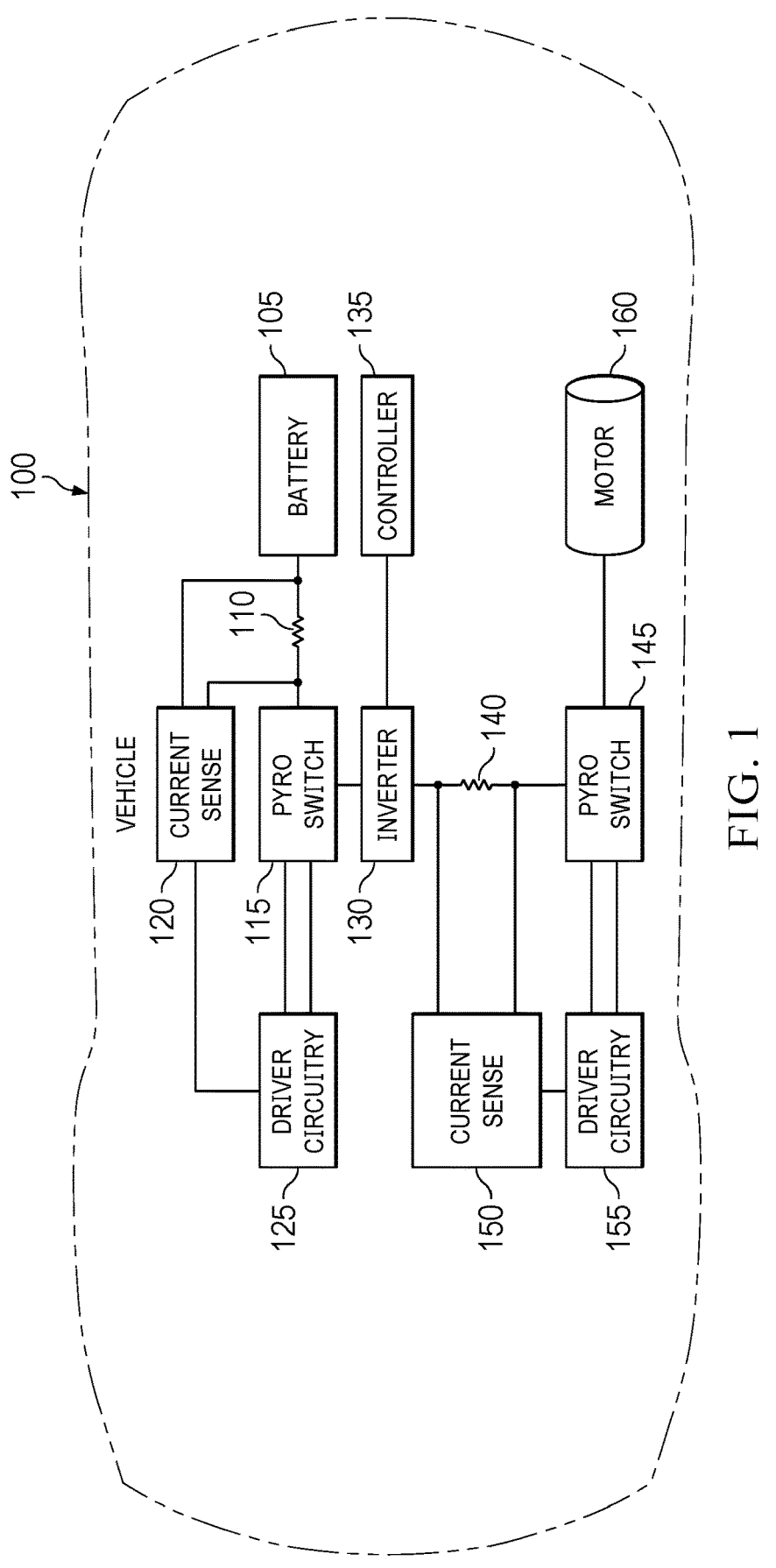
FIG. 1 is a block diagram of an example vehicle including an example pyro switch coupled to driver circuitry that activates the pyro switch to physically disconnect components of the vehicle.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

As electronic manufacturing technologies continue to advance, transistors have become capable of safely operating across an increasingly wide range of voltages. Transistors have a safe operating area (SOA), which defines the range of voltages that can be safely applied to terminals of a transistor. The safe operation area characterizes voltage differences between a drain terminal and a source terminal, for corresponding gate voltage. Applying voltages to terminals of a transistor according to the safe operation area allow the transistor to continue to operate as designed (e.g., intended). Applying voltages to terminals of a transistor that are not characterized by the safe operating area could result in permanent damages.

Some transistors, such as a laterally diffused metal-oxide semiconductor (LDMOS), are more likely to damage when voltages are applied to terminals of the transistor that are not within the SOA. Also, use of such transistors in relatively high voltage applications is less likely due to voltage limitations of the SOA. In such applications, designers are incentivized to include SOA circuitry to detect when a drain-to-source voltage of a transistor approaches a voltage beyond the SOA. The SOA circuitry triggers gate-to-source voltage (VGS) clamp circuitry to prevent the gate voltage from increasing, which reduces a maximum safe drain-to-source voltage that may be applied. The VGS clamp circuitry sets the gate voltage to a value that prevents the drain-to-source voltage from being outside the SOA.

The VGS clamp circuitry limits the gate-to-source voltage of a transistor. The SOA circuitry enables the VGS clamp circuitry when the drain-to-source voltage increases beyond a threshold value configurable by the SOA circuitry. The VGS clamp circuitry allows current to flow from the gate of a transistor to limit the gate-to-source voltage to a reference value. A pull down current, of the VGS clamp circuitry, increases a speed of a discharge of the gate-to-source voltage and causes the drain-to-source voltage to increase. The drain-to-source voltage increases as the pull down current increases. Accordingly, to prevent the drain-to-source voltage from exceeding the SOA of a transistor, the pull down current of the VGS clamp circuitry is limited, which results in a decrease in the speed of discharge.

In other applications, designers include gate-to-drain voltage (VGD) clamp circuitry to prevent the drain-to-source voltage from increasing beyond the SOA. The VGD clamp circuitry sets the drain-to-source voltage to a value that prevents the transistor from operating outside of the SOA. The VGD clamp circuitry is enabled when the drain-to-source voltage approaches a threshold value. The VGD clamp circuitry takes a pull down current from a drain terminal of the transistor to limit the drain-to-source voltage of a transistor. In some applications, the VGD clamp circuitry uses a freewheeling diode to allow current to flow when a drain voltage of a transistor is greater than a supply voltage. In other applications, the VGD clamp circuitry includes a Schottky diode to break down when a gate-to-drain voltage is greater than a breakdown voltage.

Examples described herein include clamp control circuitry to sequence clamping a gate-to-source voltage and a drain-to-source voltage of a transistor using multiple voltage clamps. In some described examples, driver circuitry includes example SOA circuitry, example VGS clamp circuitry, example VGD clamp circuitry, and example clamp control circuitry. The clamp control circuitry enables the VGS clamp circuitry when the SOA circuitry determines the gate-to-source voltage and the drain-to-source voltage increases beyond threshold voltage values. The VGS clamp circuitry sinks a pull down current while enabled.

The VGD clamp circuitry detects when the drain-to-source voltage is greater than a threshold value. The clamp control circuitry disables the VGS clamp circuitry when the VGD clamp circuitry detects the drain-to-source voltage is greater than the threshold value. Such detection indicates that the drain-to-source voltage is approaching voltages outside of the SOA. The clamp control circuitry enables a current source to generate a pull down current while the VGD clamp circuitry is enabled. The current source decreases a settling time of the transistor after disabling the VGS circuitry. Further, the current source reduces overshoot of the drain-to-source voltage when the VGD clamp circuitry begins to limit the drain-to-source voltage of the transistor.

FIG. 1 is a block diagram of an example vehicle 100. In the example of FIG. 1, the vehicle 100 includes an example battery 105, a first example resistor 110, a first example pyro switch 115, first example current sense circuitry 120, first example driver circuitry 125, an example inverter 130, an example controller 135, a second example resistor 140, a second example pyro switch 145, second example current sense circuitry 150, second example driver circuitry 155, and an example motor 160. Although in the example of FIG. 1, components 105-160 are illustrated, the vehicle 100 includes other components in other examples. The vehicle 100 includes the pyro switches 115 and 145 as a safety feature that the driver circuitries 125 and/or 155 trigger when the current sense circuitries 120 and/or 150 detect a relatively high current that is a safety issue. Such currents may be a result of a short circuit and/or component failure. Although in the example of FIG. 1 the driver circuitries 125 and 155 are shown in the vehicle 100, the driver circuitries 125 and/or 155 may be implemented in other systems in accordance with the teachings described herein.

The battery 105 is coupled to the first pyro switch 115 by the first resistor 110. The battery 105 stores power for use at a future time. The battery 105 supplies the power to the inverter 130 through the first resistor 110 and the first pyro switch 115.

The first resistor 110 has a first terminal coupled to the battery 105 and a first input of the first current sense circuitry 120. The first resistor 110 has a second terminal coupled to the first pyro switch 115 and a second input of the first current sense circuitry 120. The first resistor 110 has a resistance ($R_S$). During operation, a first voltage difference is created or generated between the first and second terminals of the first resistor 110. The first voltage difference across the first resistor 110 is approximately equal to a current from the battery 105 times the resistance of the first resistor 110. In some examples, the first resistor 110 is referred to as a sense resistor and/or an inline current sensor. Although in the example of FIG. 1 the first resistor 110 is shown, alternate methods of sensing current may be used in accordance with the teachings described herein.

The first pyro switch 115 has a first terminal coupled to the second terminal of the first resistor 110. The first pyro switch has a second terminal coupled to the inverter 130. The first pyro switch 115 has a third and fourth terminal coupled to the first driver circuitry 125. The first pyro switch 115 has a first state of operation and a second state of operation. During the first state, the first pyro switch 115 allows current from the battery 105 to flow to the inverter 130. The first state may be referred to as an unfired state. During the second state, the first pyro switch 115 physically disconnects the first and second terminal of the first pyro switch 115. The second state may be referred to as a fired state. In some examples, the state of the first pyro switch 115 depends on the first driver circuitry 125. For example, the first driver circuitry 125 causes the first pyro switch 115 to transition from the first state to the second state by supplying a relatively high-current for a short duration. Such a current may be referred to as an initiator current. Advantageously, the first pyro switch 115 may be used as a safety measures to physically disconnect electrical systems. In automotive applications, the first pyro switch 115 may be enabled upon detection of a circuit malfunction, an accident, overcharging, etc. An example of the first pyro switch 115 is described in further detail in FIG. 2, below.

The first input of the first current sense circuitry 120 is coupled to the first terminal of the first resistor 110. The second input of the first current sense circuitry 120 is coupled to the second terminal of the first resistor 110. The first current sense circuitry 120 has an output coupled to the first driver circuitry 125. The first current sense circuitry 120 determines a current flowing through the first resistor 110. In some examples, the first current sense circuitry 120 determines the current by dividing a voltage difference between the first and second terminals of the first resistor 110 by the resistance of the first resistor 110. The first current sense circuitry 120 alerts the first driver circuitry 125 of a relatively high current by the output of first current sense circuitry 120. In some examples, the first current sense circuitry 120 sends a command to the first driver circuitry 125 by the output to indicate a detection of the relatively high current. In other examples, the first current sense circuitry 120 asserts the output to indicate a detection of the relatively high current. Such a relatively high current may be referred to as an overcurrent and/or a short circuit current. In some examples, the first current sense circuitry 120 is referred to as an overcurrent sensor.

The first driver circuitry 125 has first and second terminals coupled to the third and fourth terminals of the first pyro switch 115. The first driver circuitry 125 has an input coupled to the output of the first current sense circuitry 120. The first driver circuitry 125 modifies the state of the first pyro switch 115 based on the output of the first current sense circuitry 120. The first driver circuitry 125 causes the first pyro switch 115 to change from the first state to the second state by supplying an initiator current for a short duration of time. In some examples, the first driver circuitry 125 supplies the initiator current after the first current sense circuitry 120 detects an over current. In other examples, the first driver circuitry 125 supplies the initiator current after detecting that the vehicle 100 has been in an accident. An example of the first driver circuitry 125 is described in further detail in FIGS. 2 and 3, below.

The inverter 130 has a first terminal coupled to the first pyro switch 115. The inverter 130 has a second terminal coupled to the controller 135. The inverter 130 has a third terminal coupled to the second resistor 140. The inverter 130 converts direct current (DC) power from the battery 105 to alternating current (AC) power for the motor 160. The inverter 130 determines an amount of DC power to convert based on the controller 135. In some examples, the controller 135 increases a speed of the vehicle 100 by increasing the amount of AC power from the inverter 130. The inverter 130 supplies the AC power to the motor 160 by the second resistor 140 and the second pyro switch 145.

The controller 135 is coupled to the inverter 130. The controller 135 determines an amount of power the inverter 130 converts from the battery 105 to supply to the motor 160. In some examples, the controller 135 modifies the amount of power that the inverter 130 converts to change a speed of the vehicle 100. For example, decreasing the amount of power the inverter 130 supplies to the motor 160 decreases a speed of the vehicle 100.

The second resistor 140 has a first terminal coupled to the inverter 130 and a first input of the second current sense circuitry 150. The second resistor 140 has a second terminal coupled to the second pyro switch 145 and a second input of the second current sense circuitry 150. The second resistor 140 has a resistance ($R_S$). During operation, a voltage difference is created or generated between the first and second terminals of the second resistor 140. The voltage difference across the second resistor 140 is approximately equal to a current from the inverter 130 times the resistance of the second resistor 140. In some examples, the second resistor 140 is referred to as a sense resistor and/or an inline current sensor. Although in the example of FIG. 1 the second resistor 140 is shown, alternate methods of sensing current may be used in accordance with the teachings described herein.

The second pyro switch 145 has a first terminal coupled to the second terminal of the second resistor 140. The second pyro switch 145 has a second terminal coupled to the motor 160. The second pyro switch 145 has a third and fourth terminal coupled to the second driver circuitry 155. The second pyro switch 145 has a first state of operation and a second state of operation. During the first state, the second pyro switch 145 allows current from the inverter 130 to flow to the motor 160. The first state may be referred to as an unfired state. During the second state, the second pyro switch 145 physically disconnects the first and second terminal of the second pyro switch 145. The second state may be referred to as a fired state. In some examples, the state of the second pyro switch 145 depends on the second driver circuitry 155. For example, the second driver circuitry 155 causes the second pyro switch 145 to transition from the first state to the second state by supplying an initiator current for a short duration. Advantageously, the second pyro switch 145 may be used as a safety measure to physically disconnect electrical systems. An example of the second pyro switch 145 is described in further detail in FIG. 2, below.

The first input of the second current sense circuitry 150 is coupled to the first terminal of the second resistor 140. The second input of the second current sense circuitry 150 is coupled to the second terminal of the second resistor 140. The second current sense circuitry 150 has an output coupled to the second driver circuitry 155. The second current sense circuitry 150 determines a current flowing through the second resistor 140. In some examples, the second current sense circuitry 150 determines the current by dividing a voltage difference between the first and second terminals of the second resistor 140 by the resistance of the second resistor 140. The second current sense circuitry 150 alerts the second driver circuitry 155 of a relatively high current by the output of second current sense circuitry 150. In some examples, the second current sense circuitry 150 sends a command to the second driver circuitry 155 by the output to indicate a detection of the relatively high current. In other examples, the second current sense circuitry 150 asserts the output to indicate a detection of the relatively high current. In some examples, the second current sense circuitry 150 is referred to as an over current sensor.

The second driver circuitry 155 has a first and second terminal coupled to the third and fourth terminals of the second pyro switch 145. The second driver circuitry 155 has an input coupled to the output of the second current sense circuitry 150. The second driver circuitry 155 modifies the state of the second pyro switch 145 based on the output of the second current sense circuitry 150. The second driver circuitry 155 causes the second pyro switch 145 to change from the first state to the second state by supplying an initiator current for a short duration of time. In some examples, the second driver circuitry 155 supplies the initiator current after the second current sense circuitry 150 detects an over current. In other examples, the second driver circuitry 155 supplies the initiator current after detecting that the vehicle 100 has been in an accident. An example of the second driver circuitry 155 is described in further detail in FIGS. 2 and 3, below.

The motor 160 is coupled to the second pyro switch 145. The motor 160 converts the AC power from the inverter 130 into mechanical power. The vehicle 100 uses the mechanical power of the motor 160 to move. Advantageously, the pyro switches 115 and 145 protect the motor 160 from relatively high currents that may cause permanent damage.

Figure 2:
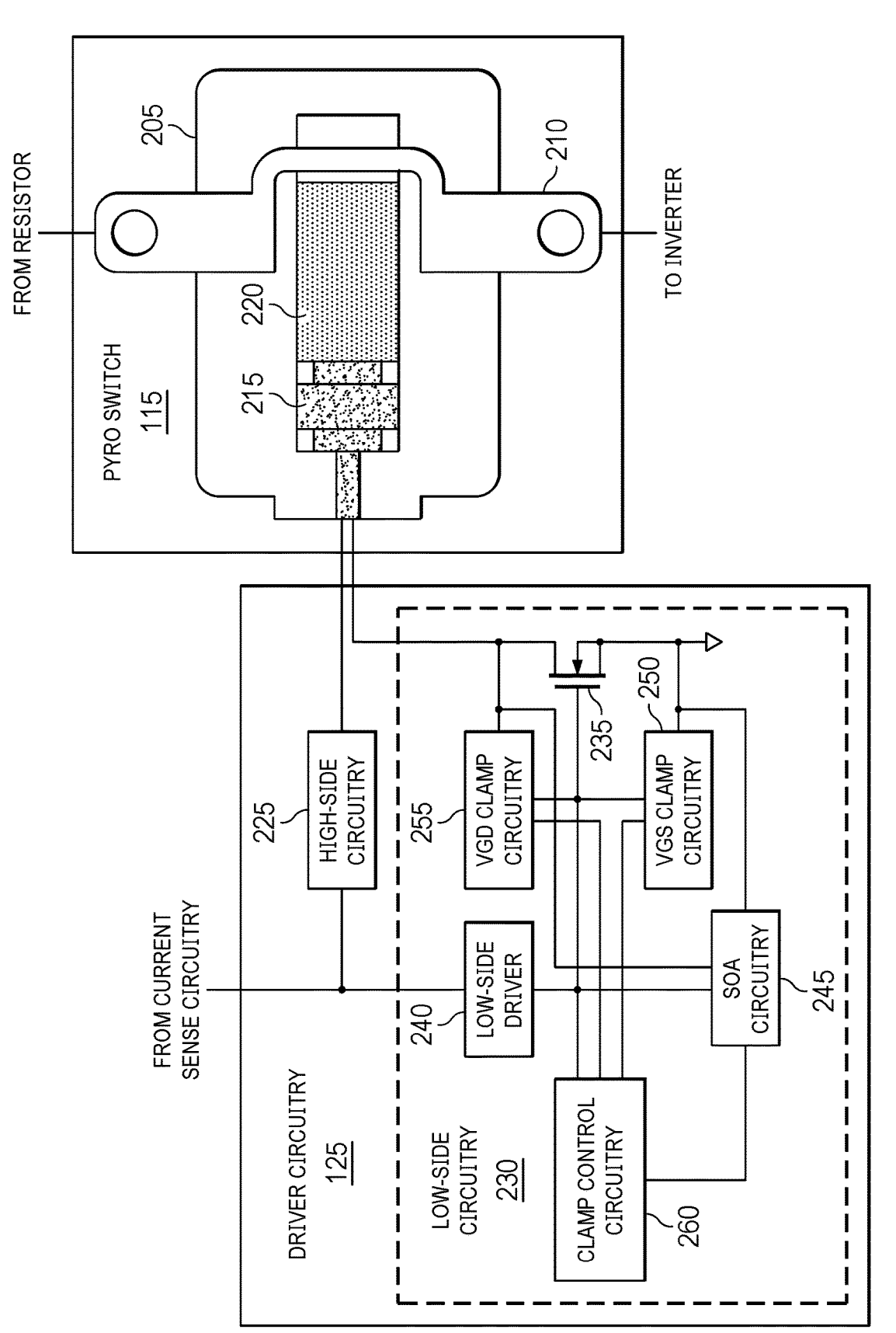
FIG. 2 is a block diagram of an example of the driver circuitry of FIG. 1 and the pyro switch of FIG. 1, the driver circuitry including example high-side circuitry and example low-side circuitry.

FIG. 2 is a block diagram of an example of the driver circuitries 125 and 155 of FIG. 1 and an example of the pyro switches 115 and 145 of FIG. 1. However, only the driver circuitry 125 and the pyro switch 115 are shown in FIG. 2 for ease of illustration. The driver circuitry 125 has an input that can be coupled to the current sense circuitry 120 (or 150 for driver circuitry 155) of FIG. 1. The driver circuitry 125 has first and second outputs coupled to the pyro switch 115. The driver circuitry 125 supplies an initiator current to the pyro switch 115. The initiator current causes the pyro switch 115 to change from an unfired state to a fired state. In some examples, the driver circuitry 125 supplies the initiator current in response to a detection of a relatively high current by the current sense circuitry 120. The pyro switch 115 physically disconnects the first and second outputs of the driver circuitry 125.

In the example of FIG. 2, the pyro switch 115 includes an example housing 205, an example bus bar 210, an example initiator 215, and an example piston 220. The pyro switch 115 is manufactured in the unfired state (illustrated in FIG.

2). In the unfired state, the pyro switch 115 allows current to flow through the bus bar 210. In the fired state, the piston 220 prevents current from flowing through the bus bar 210. The driver circuitry 125 causes the pyro switch 115 to transition from the unfired state to the fired state by supplying an initiator current.

The housing 205 encloses a portion of the bus bar 210, the initiator 215, and the piston 220. The bus bar 210 has a first terminal coupled to the first resistor 110. The bus bar 210 has a second terminal coupled to the inverter 130. The bus bar 210 allows current to flow from the first terminal to the second terminal when in the unfired state.

The initiator 215 has first and second terminals coupled to the driver circuitry 125. The initiator 215 receives the initiation current from the driver circuitry 125. In the unfired state, the initiator 215 is coupled to the piston 220. The initiator 215 causes the piston 220 to break the bus bar 210 in response to the initiator current. In some examples, the initiator 215 ignites a gas to cause a motion of the piston 220. In the fired state, the initiator 215 is no longer coupled to the piston 220. Immediately following a transition from the unfired state to the fired state, the initiator 215 discharges current using the driver circuitry 125.

In the unfired state, the piston 220 is coupled to the initiator 215. The piston 220 breaks the bus bar 210 when the initiator 215 receives the initiator current. In the fired state (not illustrated), the piston 220 is coupled to a broken portion of the bus bar 210. Accordingly, current can no longer flow from the first terminal to the second terminal when in the fired state.

In the example of FIG. 2, the driver circuitry 125 includes example high-side circuitry 225 and example low-side circuitry 230. The driver circuitry 125 sources current to the pyro switch 115 using the high-side circuitry 225.

In the example of FIG. 2, the low-side circuitry 230 includes an example drive transistor 235, an example low-side driver 240, example SOA circuitry 245, example VGS clamp circuitry 250, example VGD clamp circuitry 255, and example clamp control circuitry 260. The low-side circuitry 230 ensures the gate-to-source and drain-to-source voltages of the drive transistor 235 remain in the SOA using the clamp circuitry 250 and 255. In some examples, the clamp control circuitry 260 sequences the clamp circuitry 250 and 255 following a short of the drain terminal of the drive transistor 235 to a voltage source.

The drive transistor 235 has a drain terminal (or simply drain), a source terminal (or simple source), and a gate terminal (or simply gate). The drain terminal of the drive transistor 235 can be coupled to the pyro switch 115. In some examples, the drain terminal and/or source terminal of the drive transistor 235 may be referred to as a current terminal or simply a terminal. The source terminal of the drive transistor 235 is coupled to a common terminal that provides a common potential (e.g., ground). The gate terminal of the drive transistor 235 is coupled to the low-side driver 240 and the circuitries 245-260. The drive transistor 235 sources current from the drain terminal to the source terminal based on the gate terminal. In some examples, the low-side driver 240 sets a gate voltage of the gate terminal to cause the drive transistor 235 to source current. In such examples, the circuitries 250-260 sets the gate voltage to modify operations of the drive transistor 235. In the example of FIG. 2, the drive transistor 235 is an n-channel metal-oxide semiconductor field-effect transistor (MOSFET), and particularly a LDMOS transistor. Alternatively, the drive transistor 235 may be an n-channel field-effect transistor, an n-channel insulated-gate bipolar transistor (IGBT), an n-channel junction field effect transistor (JFET), an NPN bipolar junction transistor (BJT) and/or, with slight modifications, a p-type equivalent device.

The low-side driver 240 has an input that can be coupled to the current sense circuitry 120 (and/or 150 for driver circuitry 155). The low-side driver 240 has a terminal coupled to the gate terminal of the drive transistor 235. The low-side driver 240 sets a voltage of the gate terminal of the drive transistor 235. In example operation, the low-side driver 240 causes the drive transistor 235 to sink current to the common potential when the voltage of the gate terminal is greater than a threshold voltage of the drive transistor 235. In some examples, the low-side driver 240 causes the drive transistor 235 to sink the initiator current when the current sense circuitry 120 (and/or 150) detects a relatively high current being supplied to the pyro switches 115 and/or 155. In such examples, the initiator current causes the pyro switch 115 to transition from an unfired state to a fired state.

The SOA circuitry 245 has a first terminal coupled to the gate terminal of the drive transistor 235. The SOA circuitry 245 has a second terminal coupled to the source terminal of the drive transistor 235. The SOA circuitry 245 has a third terminal coupled to the drain terminal of the drive transistor 235. The SOA circuitry 245 has a fourth terminal coupled to the clamp control circuitry 260. The SOA circuitry 245 determines when the drain-to-source voltage of the drive transistor 235 is approaching a voltage outside of the SOA of the drive transistor 235. In some examples, the SOA circuitry 245 detects the drain-to-source voltage of the drive transistor 235 is approaching a boundary of the SOA by comparing a reference voltage to the drain-to-source voltage of the drive transistor 235. The SOA circuitry 245 indicates that the drain-to-source voltage is approaching the boundary of the SOA to the clamp control circuitry 260. An example of the SOA circuitry 245 is described in further detail in FIG. 3, below.

The VGS clamp circuitry 250 has a first terminal coupled to the gate terminal of the drive transistor 235. The VGS clamp circuitry 250 has a second terminal coupled to the source terminal of the drive transistor 235. The VGS clamp circuitry 250 has a third terminal coupled to the clamp control circuitry 260. The clamp control circuitry 260 enables and disables the VGS clamp circuitry 250. The VGS clamp circuitry 250 sets (e.g., clamps, holds) the gate-to-source voltage of the drive transistor 235 to a first clamp voltage when the clamp control circuitry 260 enables the VGS clamp circuitry 250. In some examples, the VGS clamp circuitry 250 sinks excess current from the gate terminal of the drive transistor 235 to prevent the gate-to-source voltage from exceeding the first clamp voltage. Although the VGS clamp circuitry 250 sinks current to hold the gate-to-source voltage of the drive transistor 235 to the first clamp voltage, the drain-to source voltage of the drive transistor 235 continues to increase. An example of the VGS clamp circuitry 250 is described in further detail in FIG. 3, below.

The VGD clamp circuitry 255 has a first terminal coupled to the gate terminal of the drive transistor 235. The VGD clamp circuitry 255 has a second terminal coupled to the drain terminal of the drive transistor 235. The VGD clamp circuitry 255 has a third terminal coupled to the clamp control circuitry 260. The VGD clamp circuitry 255 compares the gate-to-drain voltage of the drive transistor 235 to a threshold voltage. The VGD clamp circuitry 255 indicates the gate-to-drain voltage of the drive transistor 235 is greater than the threshold voltage to the clamp control circuitry 260. In some examples, the threshold voltage corresponds to a break down voltage of one or more Schottky diodes in series. In such an example, the VGD clamp circuitry 255 indicates the gate-to-drain voltage of the drive transistor 235 is greater than the threshold voltage after the gate-to-drain voltage causes one or more of the Schottky diodes to breakdown. The VGD clamp circuitry 255 sets (e.g., clamps, holds) the drain-to-source voltage of the drive transistor 235 to a second clamp voltage when enabled by a gate-to-drain voltage greater than the threshold voltage. Advantageously, the VGD clamp circuitry 255 prevents the drain-to-source voltage from exceeding the SOA of the drive transistor 235 by setting the drain-to-source voltage equal to the second clamp voltage. An example of the VGD clamp circuitry 255 is described in further detail in FIG. 3, below.

The clamp control circuitry 260 has a first terminal coupled to the gate terminal of the drive transistor 235. The clamp control circuitry 260 has a second terminal coupled to the SOA circuitry 245. The clamp control circuitry 260 has a third terminal coupled to the VGS clamp circuitry 250. The clamp control circuitry 260 has a fourth terminal coupled to the VGD clamp circuitry 255. The clamp control circuitry 260 receives a first indication from the SOA circuitry 245. The clamp control circuitry 260 enables the VGS clamp circuitry 250 after receiving the first indication from the SOA circuitry 245. The clamp control circuitry 260 receives a second indication from the VGD clamp circuitry 255. The clamp control circuitry 260 disables the VGS clamp circuitry 250 after receiving the second indication from the VGD clamp circuitry 255. In some examples, the clamp control circuitry 260 sinks current from the gate terminal of the drive transistor 235 after receiving the second indication from the VGD clamp circuitry 255 and/or disabling the VGS clamp circuitry 250. Advantageously, the clamp control circuitry 260 sequences use of both of the clamp circuitries 250 and 255 to prevent voltages of the drive transistor 235 from exceeding the SOA. An example of the clamp control circuitry 260 is described in further detail in FIG. 3, below.

Figure 3:
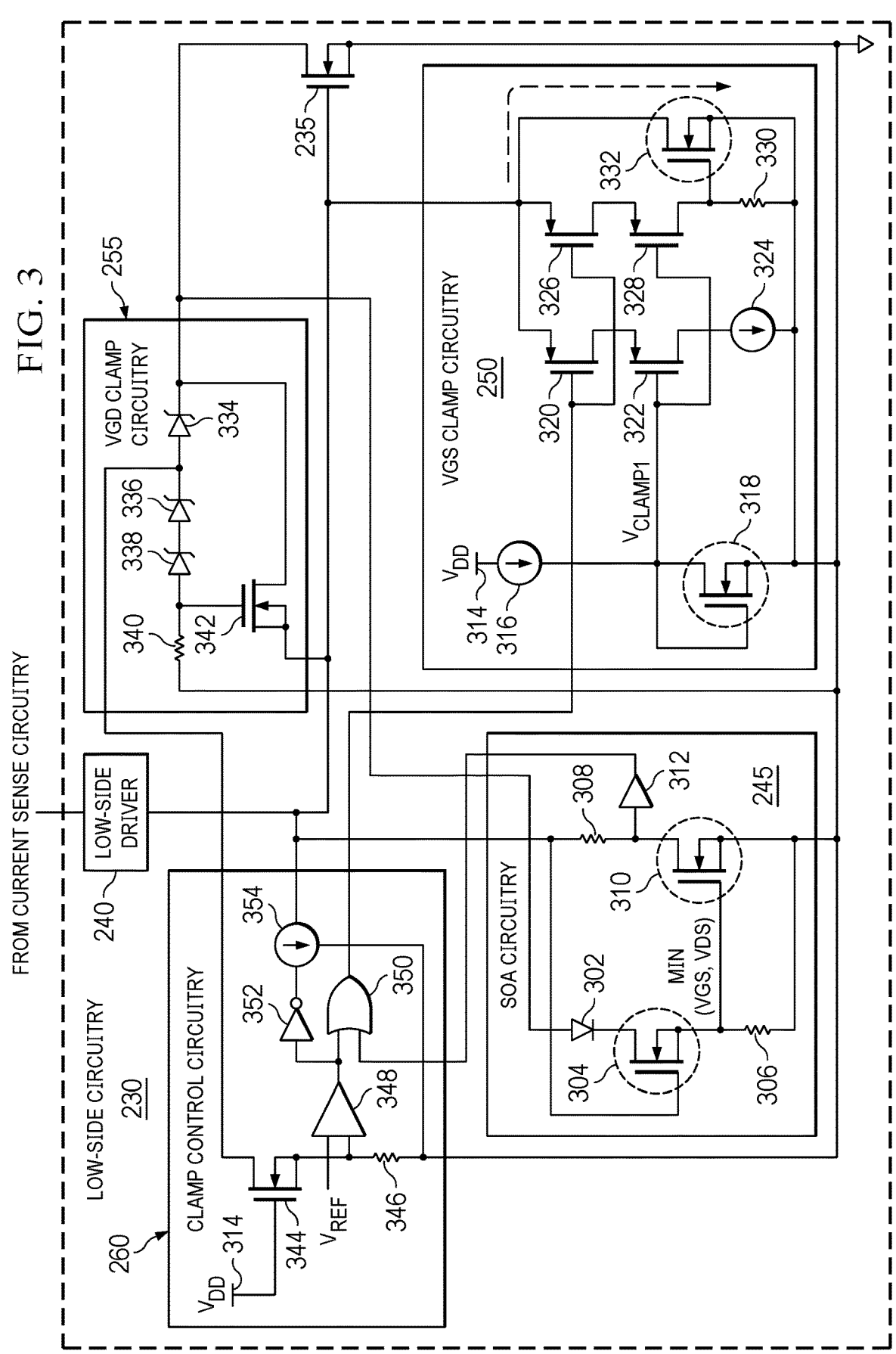
FIG. 3 is a schematic diagram of an example of the low-side circuitry of FIG. 2 including an example drive transistor, first example clamp circuitry, second example clamp circuitry, and example clamp control circuitry.

FIG. 3 is a schematic diagram of an example of the low-side circuitry 230 of FIG. 2 including examples of the SOA circuitry 245 of FIG. 2, the VGS clamp circuitry 250 of FIG. 2, the VGD clamp circuitry 255 of FIG. 2, and the clamp control circuitry 260 of FIG. 2. The low-side circuitry 230 controls the drive transistor 235 of FIG. 2 using the circuitries 240-260. The low-side circuitry 230 uses the circuitries 245-260 to prevent relatively high voltages from damaging the drive transistor 235. The drive transistor 235 may be referred to as the first transistor 235. In some examples, the low-side circuitry 230 is coupled to the pyro switch 115 of FIGS. 1 and 2. In other examples, the low-side circuitry 230 is coupled to another element (e.g., device, component, etc.).

In the example of FIG. 3, the SOA circuitry 245 includes an example diode 302, a second example transistor 304, a first example resistor 306, a second example resistor 308, a third example transistor 310, and a first example buffer 312. The SOA circuitry 245 causes the clamp control circuitry 260 to enable the VGS clamp circuitry 250 when the drain-to-source voltage of the first transistor 235 increases. The SOA circuitry 245 detects when the drain-to-source voltage of the first transistor 235 is increasing. In some examples, the SOA circuitry 245 detects an increase in the drain-to-source voltage of the first transistor 235 in response to the drain terminal of the first transistor 235 being shorted to a voltage source.

The diode 302 has a first terminal coupled to the drain terminal of the first transistor 235. The diode 302 has a second terminal coupled to the second transistor 304. The diode 302 supplies current to the second transistor 304 when a voltage of the first terminal is greater than a voltage of the second terminal. In some examples, a voltage difference between the first terminal and the second terminal of the diode 302 needs to be greater than a minimum voltage to supply current to the second transistor 304. In such examples, a plurality of diodes may be coupled in series to increase the minimum voltage. Although in the example of FIG. 3 the diode 302 is illustrated, an alternative diode may be used in accordance with the teachings described herein, such as a Schottky diode, Zener diode, etc.

The second transistor 304 has a gate terminal coupled to the gate terminal of the first transistor 235. The second transistor 304 has a drain terminal coupled to the diode 302. The second transistor 304 has a source terminal coupled to the first resistor 306 and the third transistor 310. The second transistor 304 supplies current from the diode 302 to the first resistor 306 when turned on (e.g., enabled, conducting). The second transistor 304 prevents the diode 302 from supplying current to the first resistor 306 when turned off (e.g., disabled, non-conducting). In example operations, a gate voltage greater than or equal to a threshold voltage of the second transistor 304 turns on the second transistor 304. In such examples, the second transistor 304 allows current to flow to the first resistor 306 when the drain-to-source voltage of the first transistor 235 begins to increase. For example, the diode 302 prevents the second transistor 304 sourcing current until the drain-to-source voltage of the first transistor 235 is greater than zero volts. In the example of FIG. 3, the second transistor 304 is an n-channel MOSFET. Alternatively, the second transistor 304 may be an n-channel FET, an n-channel IGBT, an n-channel JFET, an NPN BJT and/or, with slight modifications, a p-type equivalent device.

The first resistor 306 has a first terminal coupled to the source terminal of the second transistor 304. The first resistor 306 has a second terminal coupled to the source terminal of the first transistor 235. The first resistor 306 creates a voltage difference between the first and second terminals based on current from the second transistor 304 and a resistance of the first resistor 306. The first resistor 306 turns on (e.g., enables) the third transistor 310 when the voltage difference is greater than or equal to a threshold voltage of the third transistor 310.

The second resistor 308 has a first terminal coupled to the gate terminal of the first transistor 235. The second resistor 308 has a second terminal coupled to the third transistor 310 and the buffer 312. The second resistor 308 creates a voltage difference between the first and second terminals based on current flowing through the third transistor 310 and a resistance of the second resistor 308. The second resistor 308 creates the voltage difference when the third transistor 310 is turned on (e.g., enabled, conducting). A voltage of the second terminal of the second resistor 308 is approximately equal to the gate voltage of the first transistor 235 when the third transistor 310 is turned off (e.g., disabled, non-conducting).

The third transistor 310 has a gate terminal coupled to the second transistor 304 and the first resistor 306. The third transistor 310 has a drain terminal coupled to the second resistor 308 and the buffer 312. The third transistor 310 has a source terminal coupled to the source terminal of the first transistor 235. The third transistor 310 allows current to flow from the second resistor 308 to the source terminal of the first transistor 235 when turned on (e.g., enabled, conducting). The third transistor 310 prevents the second resistor 308 from sourcing a current when turned off (e.g., disabled, non-conducting). The first resistor 306 turns on the third transistor 310 by creating a voltage difference greater than or equal to a threshold voltage of the third transistor 310. The third transistor 310 causes the voltage of the second terminal of the second resistor 308 to be approximately equal to a voltage of the source terminal of the first transistor 235. In the example of FIG. 3, the third transistor 310 is an n-channel MOSFET. Alternatively, the third transistor 310 may be an n-channel FET, an n-channel IGBT, an n-channel JFET, an NPN BJT and/or, with slight modifications, a p-type equivalent device.

The buffer 312 has a first terminal coupled to the second resistor 308 and the third transistor 310. The buffer 312 has a second terminal coupled to the clamp control circuitry 260. The buffer 312 isolates the second resistor 308 from the clamp control circuitry 260. Accordingly, current from the second resistor 308 is supplied to the third transistor 310. The buffer 312 buffers the voltage of the second terminal of the second resistor 308. The buffer 312 supplies a buffered version of the voltage of the second terminal of the second resistor 308 to the clamp control circuitry 260. In example operation, the second terminal of the buffer 312 may be approximately equal to one of the gate or source voltage of the first transistor 235. For example, the voltage of the second terminal of the buffer 312 is approximately equal to the source voltage of the first transistor 235 when the drain-to-source voltage causes current to flow through the diode 302 and cause the first resistor 306 to generate a voltage that turns on the third transistor 310. In another example, the voltage of the second terminal of the buffer 312 is approximately equal to the gate voltage of the first transistor 235 when the drain-to-source voltage does not cause current to flow through the diode 302 and/or does not cause the first resistor 306 to generate a voltage that turns on the third transistor 310.

Advantageously, the SOA circuitry 245 indicates that the drain-to-source voltage of the first transistor 235 is increasing when the second terminal of the buffer 312 is approximately equal to the source voltage of the first transistor 235. Advantageously, the SOA circuitry 245 indicates that the drain-to-source voltage of the first transistor 235 is not increasing when the second terminal of the buffer 312 is approximately equal to the gate voltage of the first transistor 235. Accordingly, the clamp control circuitry 260 may enable the VGS clamp circuitry 250 to discharge excess charge from the gate terminal of the first transistor 235.

In the example of FIG. 3, the VGS clamp circuitry 250 includes an example voltage reference ($V_{DD}$) 314, a first example current source 316, a fourth example transistor 318, a fifth example transistor 320, a sixth example transistor 322, a second example current source 324, a seventh example transistor 326, an eighth example transistor 328, a third example resistor 330, and a ninth example transistor 332. The VGS clamp circuitry 250 sets the gate-to-source voltage of the first transistor 235 to be approximately equal to a first clamp voltage ($V_{CLAMP1}$). The clamp control circuitry 260 enables the VGS clamp circuitry 250 by turning on the transistors 320 and 326.

The first voltage reference 314 is coupled to the first current source 316. The first voltage reference 314 is provided by a power supply (not illustrated), which allows current to be sourced by the first current source 316 without modifying the first voltage reference 314.

The first current source 316 has a first terminal coupled to the first voltage reference 314. The first current source 316 has a second terminal coupled to the transistors 318, 322, and 328. The first current source 316 sources a current from the first voltage reference 314. The first current source 316 supplies the current to the fourth transistor 318. In example an operation, the first current source 316 causes the fourth transistor 318 to generate the first clamp voltage ($V_{CLAMP1}$). The VGS clamp circuitry 250 sets the gate-to-source voltage of the first transistor 235 to be approximately equal to the first clamp voltage. Modifying the current of the first current source 316 modifies the first clamp voltage.

The fourth transistor 318 has a gate and drain terminal coupled to the first current source 316 and the transistor 322 and 328. The fourth transistor 318 has a source terminal coupled to the source terminal of the first transistor 235. The fourth transistor 318 receives current from the first current source 316. The current causes the fourth transistor 318 to generate the first clamp voltage at the gate and drain terminals of the fourth transistor 318. The fourth transistor 318 supplies the first clamp voltage to the transistors 322 and 328.

Alternatively, the first current source 316 and the fourth transistor 318 may be replaced and/or modified, in accordance with the teachings described herein, to use alternative voltage generation circuitry.

The fifth transistor 320 has a gate terminal coupled to the clamp control circuitry 260. The fifth transistor 320 has a source terminal coupled to the gate terminal of the first transistor 235. The fifth transistor 320 has a drain terminal coupled to the sixth transistor 322. The fifth transistor 320 allows current to flow from the gate terminal of the first transistor 235 to the sixth transistor 322 when turned on (e.g., enabled, conducting). In some examples, the clamp control circuitry 260 turns on the fifth transistor 320 by applying a voltage approximately equal to the common potential or the voltage of the source terminal of the first transistor 235 to the gate terminal of the fifth transistor 320. In such examples, the clamp control circuitry 260 turns off the fifth transistor 320 by applying a voltage approximately equal to the voltage of the gate terminal of the first transistor 235 to the gate terminal of the fifth transistor 320. In the example of FIG. 3, the fifth transistor 320 is a p-channel MOSFET. Alternatively, the fifth transistor 320 may be a p-channel FET, a p-channel IGBT, a p-channel JFET, an PNP BJT and/or, with slight modifications, a n-type equivalent device.

The sixth transistor 322 has a gate terminal coupled to the fourth transistor 318. The sixth transistor 322 has a source terminal coupled to the fifth transistor 320. The sixth transistor 322 has a drain terminal coupled to the second current source 324. The sixth transistor 322 allows the second current source 324 to source current through the sixth transistor 322 when turned on. The sixth transistor 322 is turned on when the gate-to-source voltage of the sixth transistor 322 is less than a threshold voltage. Accordingly, the fifth transistor 320 turns on the sixth transistor 322 by applying the gate voltage of the first transistor 235 to the source terminal of the sixth transistor 322. In the example of FIG. 3, the sixth transistor 322 is a p-channel MOSFET. Alternatively, the sixth transistor 322 may be a p-channel FET, an p-channel IGBT, a p-channel JFET, an PNP BJT and/or, with slight modifications, an n-type equivalent device.

The second current source 324 has a first terminal coupled to the sixth transistor 322. The second current source 324 has a second terminal coupled to the source terminal of the first transistor 235. The second current source 324 supplies a current from the sixth transistor 322 to the source terminal of the first transistor 235. The second current source 324 reduces the voltage of the source terminal of the sixth transistor 322 by sinking current from the gate terminal of the first transistor 235. The sixth transistor 322 prevents the second current source 324 from sinking current once the source terminal of the sixth transistor 322 is approximately equal to the first clamp voltage. In example operations, the gate voltage of the first transistor 235 may be greater than the first clamp voltage when the clamp control circuitry 260 enables the VGS clamp circuitry 250. In such examples, the second current source 324 sinks current to pull-down the source voltage of the sixth transistor 322. However, the second current source 324 turns off the sixth transistor 322 once the source voltage of the sixth transistor 322 is approximately equal to the first clamp voltage at the gate of the sixth transistor 322. Advantageously, the second current source 324 causes the gate-to-source voltage of the first transistor 235 to be approximately equal to the first clamp voltage from the fourth transistor 318.

The seventh transistor 326 has a gate terminal coupled to the clamp control circuitry 260. The seventh transistor 326 has a source terminal coupled to the gate terminal of the first transistor 235. The seventh transistor 326 has a drain terminal coupled to the eighth transistor 328. The seventh transistor 326 allows current to flow from the gate terminal of the first transistor 235 to the eighth transistor 328 when turned on (e.g., enabled, conducting). In some examples, the clamp control circuitry 260 turns on the seventh transistor 326 by applying a voltage approximately equal to the common potential or the voltage of the source terminal of the first transistor 235 to the gate terminal of the seventh transistor 326. In such examples, the clamp control circuitry 260 turns off the seventh transistor 326 by applying a voltage approximately equal to the voltage of the gate terminal of the first transistor 235 to the gate terminal of the seventh transistor 326. In the example of FIG. 3, the seventh transistor 326 is a p-channel MOSFET. Alternatively, the seventh transistor 326 may be a p-channel FET, a p-channel IGBT, a p-channel JFET, an PNP BJT and/or, with slight modifications, a n-type equivalent device.

The eighth transistor 328 has a gate terminal coupled to the fourth transistor 318. The eighth transistor 328 has a source terminal coupled to the seventh transistor 326. The eighth transistor 328 has a drain terminal coupled to the third resistor 330 and the ninth transistor 332. The eighth transistor 328 sinks current using the third resistor 330 when turned on. The eighth transistor 328 is turned on when the gate-to-source voltage of the eighth transistor 328 is less than a threshold voltage. Also, the seventh transistor 326 turns on the eighth transistor 328 by applying the gate voltage of the first transistor 235 to the source terminal of the eighth transistor 328. In the example of FIG. 3, the eighth transistor 328 is a p-channel MOSFET. Alternatively, the eighth transistor 328 may be a p-channel FET, a p-channel IGBT, a p-channel JFET, an PNP BJT and/or, with slight modifications, a n-type equivalent device.

The third resistor 330 has a first terminal coupled to transistors 328 and 332. The third resistor 330 has a second terminal coupled to the source terminal of the first transistor 235. The third resistor 330 creates a voltage difference between the first and second terminals based on current flowing through the eighth transistor 328 and a resistance of the third resistor 330. The third resistor 330 creates the voltage difference when the third transistor 310 is turned on (e.g., enabled, conducting). A voltage of the first terminal of the third resistor 330 is approximately equal to the source voltage of the first transistor 235 plus the voltage difference when the eighth transistor 328 is turned on (e.g., enabled, conducting).

The ninth transistor 332 has a drain terminal coupled to the gate terminal of the first transistor 235 and the transistors 320 and 326. The ninth transistor 332 has a gate terminal coupled to the eighth transistor 328 and the third resistor 330. The ninth transistor 332 has a source terminal coupled to the source terminal of the first transistor 235. The ninth transistor 332 allows current to flow from the gate to source terminals of the first transistor 235 when turned on. The third resistor 330 turns on the ninth transistor 332 by creating the voltage difference. In the example of FIG. 3, the ninth transistor 332 is an n-channel MOSFET. Alternatively, the ninth transistor 332 may be an n-channel FET, an n-channel IGBT, an n-channel JFET, an NPN BJT and/or, with slight modifications, a p-type equivalent device.

Advantageously, the clamp control circuitry 260 causes the VGS clamp circuitry 250 to set the gate-to-source voltage of the first transistor 235 approximately equal to the first clamp voltage by turning on the transistors 320 and 326. Advantageously, the ninth transistor 332 sinks a relatively large current from the gate terminal of the first transistor 235. Accordingly, the relatively large current increases a speed at which the pyro switch 115 may discharge a current through the first transistor 235.

In the example of FIG. 3, the VGD clamp circuitry 255 includes a first example Schottky diode 334, a second example Schottky diode 336, a third example Schottky diode 338, a fourth example resistor 340, and a tenth example transistor 342. The VGD clamp circuitry 255 limits the drain-to-source voltage of the first transistor 235 to be approximately equal to a second clamp voltage ($V_{CLAMP2}$). The VGD clamp circuitry 255 indicates to the clamp control circuitry 260 that the drain-to-source voltage of the first transistor 235 is approaching a maximum voltage threshold. The maximum voltage threshold corresponds to a safe operating voltage of the first transistor 235, as defined by the SOA.

The first Schottky diode 334 has a first terminal coupled to the drain terminal of the first transistor 235. The first Schottky diode 334 has a second terminal coupled to the second Schottky diode 336 and the clamp control circuitry 260. The first Schottky diode 334 prevents current from flowing from the first terminal to the second terminal until the first Schottky diode 334 breaks down. The first Schottky diode 334 breaks down when a voltage difference between the first and second terminals is greater than or equal to a breakdown voltage. The breakdown voltage is a characteristic of the first Schottky diode 334. Advantageously, Schottky diodes are able to breakdown without becoming permanently damaged. Accordingly, the first Schottky diode 334 breaks down and allows current to flow from the first terminal to the second terminal when the voltage difference between the first and second terminals is greater than the breakdown voltage. A voltage of the second terminal of the first Schottky diode 334 is approximately equal to the voltage of the drain terminal of the first transistor 235 minus the breakdown voltage of the first Schottky diode 334 while the first Schottky diode 334 is broken down.

The second Schottky diode 336 has a first terminal coupled to the first Schottky diode 334. The second Schottky diode 336 has a second terminal coupled to the third Schottky diode 338. The second Schottky diode 336 prevents current from flowing from the first terminal to the second terminal until the Schottky diodes 334 and 336 have broken down. The second Schottky diode 336 breaks down when a voltage difference between the first and second terminals is greater than or equal to a breakdown voltage. The breakdown voltage is a characteristic of the second Schottky diode 336. A voltage of the second terminal of the second Schottky diode 336 is approximately equal to the voltage of the drain terminal of the first transistor 235 minus the breakdown voltages of the Schottky diodes 334 and 336 while the Schottky diodes 334 and 336 are broken down.

The third Schottky diode 338 has a first terminal coupled to the second Schottky diode 336. The third Schottky diode 338 has a second terminal coupled to the fourth resistor 340 and the tenth transistor 342. The third Schottky diode 338 prevents current from flowing from the first terminal to the second terminal until the Schottky diodes 334-338 have broken down. The third Schottky diode 338 breaks down when the drain-to-source voltage of the first transistor 235 is greater than or equal to a combination of breakdown voltages of the Schottky diodes 334-338. A voltage of the second terminal of the third Schottky diode 338 is approximately equal to the voltage of the drain terminal of the first transistor 235 minus the breakdown voltages of the Schottky diodes 334-338 while the Schottky diodes 334-338 are broken down.

The maximum voltage threshold of the VGD clamp circuitry 255 is configurable based on the breakdown voltages of the Schottky diodes 334-338. Alternatively, the VGD clamp circuitry 255 may include any plurality of Schottky diodes 334-338.

The fourth resistor 340 has a first terminal coupled to the third Schottky diode 338 and the tenth transistor 342. The fourth resistor 340 has a second terminal coupled to the source terminal of the first transistor 235. The fourth resistor 340 creates a voltage difference between the first and second terminals based on current from the third Schottky diode 338 and a resistance of the fourth resistor 340. The fourth resistor 340 turns on (e.g., enables) the tenth transistor 342 when the Schottky diodes 334-338 are broken down.

The tenth transistor 342 has a drain terminal coupled to the drain terminal of the first transistor 235. The tenth transistor 342 has a source terminal coupled to the gate terminal of the first transistor 235. The tenth transistor 342 has a gate terminal coupled to the third Schottky diode 338 and the fourth resistor 340. The tenth transistor 342 allows current to flow from the drain terminal of the first transistor 235 to the gate terminal of the first transistor 235 when turned on. The fourth resistor 340 turns on the tenth transistor 342 after the drain voltage of the first transistor 235 breaks down the Schottky diodes 334-338. In the example of FIG. 3, the tenth transistor 342 is an n-channel MOSFET. Alternatively, the tenth transistor 342 may be an n-channel FET, an n-channel IGBT, an n-channel JFET, an NPN BJT and/or, with slight modifications, a p-type equivalent device.

Advantageously, the VGD clamp circuitry 255 prevents the drain-to-source voltage of the first transistor 235 from being outside of the SOA of the first transistor 235 by setting the gate-to-drain voltage equal to a second clamp voltage. In the example of FIG. 3, the second clamp voltage is approximately equal to a combination of the breakdown voltages of the Schottky diodes 334-338. In some examples, the VGD clamp circuitry 255 may include one or more Schottky diodes to modify the second clamp voltage.

In the example of FIG. 3, the clamp control circuitry 260 includes the first voltage reference 314, an eleventh example transistor 344, a fifth example resistor 346, an example comparator 348, an example logic gate 350, an example inverter 352, and a third example current source 354. The clamp control circuitry 260 sequences use of the clamp circuitries 250 and 255.

The eleventh transistor 344 has a drain terminal coupled to the VGD clamp circuitry 255. The eleventh transistor 344 has a gate terminal coupled to the first voltage reference 314. The eleventh transistor 344 has a source terminal coupled to the fifth resistor 346 and the comparator 348. The eleventh transistor 344 allows current to flow from the drain terminal of the first transistor 235 to the gate terminal of the first transistor 235 when turned on. The first voltage reference 314 turns on the eleventh transistor 344 after the drain voltage of the first transistor 235 breaks down the first Schottky diode 334. The first Schottky diode 334 couples the drain voltage of the first transistor 235 to the drain terminal of the eleventh transistor 344 when broken down. In the example of FIG. 3, the eleventh transistor 344 is an n-channel MOSFET. Alternatively, the eleventh transistor 344 may be an n-channel FET, an n-channel IGBT, an n-channel JFET, an NPN BJT and/or, with slight modifications, a p-type equivalent device.

The fifth resistor 346 has a first terminal coupled to the eleventh transistor 344 and the comparator 348. The fifth resistor 346 has a second terminal coupled to the source terminal of the first transistor 235, which provides the common potential. The fifth resistor 346 creates a voltage difference between the first and second terminals based on current flowing through the eleventh transistor 344 and a resistance of the fifth resistor 346. The fifth resistor 346 creates the voltage difference when the eleventh transistor 344 is turned on. A voltage of the first terminal of the fifth resistor 346 is approximately equal to the source voltage of the first transistor 235 plus the voltage difference when the eleventh transistor 344 is turned on.

The comparator 348 has an input coupled to the eleventh transistor 344 and the fifth resistor 346. The comparator 348 has an output coupled to the logic gate 350 and the inverter 352. The comparator 348 compares a voltage of the input to a reference voltage (VREF). In some examples, the reference voltage is the common potential supplied by the common terminal coupled to the source terminal of the first transistor 235. The comparator 348 sets the output equal to a logic low (e.g., the common potential, a logical zero) when the voltage of the input is less than or equal to the reference voltage. The comparator 348 sets the output equal to a logic high (e.g., a supply voltage, a logical one) when the voltage of the input is greater than the reference voltage. For example, the output of the comparator 348 is a logic low when the eleventh transistor 344 is turned off. Also, the output of the comparator 348 is a logic high when the eleventh transistor 344 is turned on.

The logic gate 350 has a first input coupled to the SOA circuitry 245. The logic gate 350 has a second input coupled to the comparator 348 and the inverter 352. The logic gate 350 has an output coupled to the VGS clamp circuitry 250. In the example of FIG. 3, the logic gate 350 is an OR gate. Alternatively, the logic gate 350 may be one or more logic gates, such as an AND gate, a NAND gate, an XOR gate, an XNOR gate, etc. The logic gate 350 enables the VGS clamp circuitry 250 when the first and second inputs are logic lows. The logic gate 350 disables the VGS clamp circuitry 250 when at least one of the first or second inputs are logic highs. In example operation, the comparator 348 disables the VGS clamp circuitry 250 after the eleventh transistor 344 turns on and causes the fifth resistor 346 to create the voltage difference. In such an example operation, the SOA circuitry 245 disables the VGS clamp circuitry 250 when the drain-to-source voltage of the first transistor 235 is less than a voltage needed to turn on the transistors 304 and 310.

The inverter 352 has an input coupled to the comparator 348 and the logic gate 350. The inverter 352 has an output coupled to the third current source 354. The inverter 352 inverts the output of the comparator 348. The inverter 352 disables the third current source 354 when the output of the comparator 348 is a logic low. The inverter 352 enables the third current source 345 when the output of the comparator 348 is a logic high. Alternatively, the clamp control circuitry 260 may be modified to enable and/or disable the third current source 354.

The third current source 354 has a first terminal coupled to the gate terminal of the first transistor 235. The third current source 354 has a second terminal coupled to the source terminal of the first transistor 235. The third current source 354 has a control terminal coupled to the inverter 352. The third current source 354 sources current from the gate terminal of the first transistor 235 when enabled by the inverter 352. In an example operation, the third current source 354 sources current after the logic gate 350 disables the VGS clamp circuitry 250. Advantageously, the third current source 354 sources excess charge on the gate terminal of the first transistor 235 to prevent the gate-to-source voltage of the first transistor 235 from increasing after the VGS clamp circuitry 250 is disabled.

Figure 4:
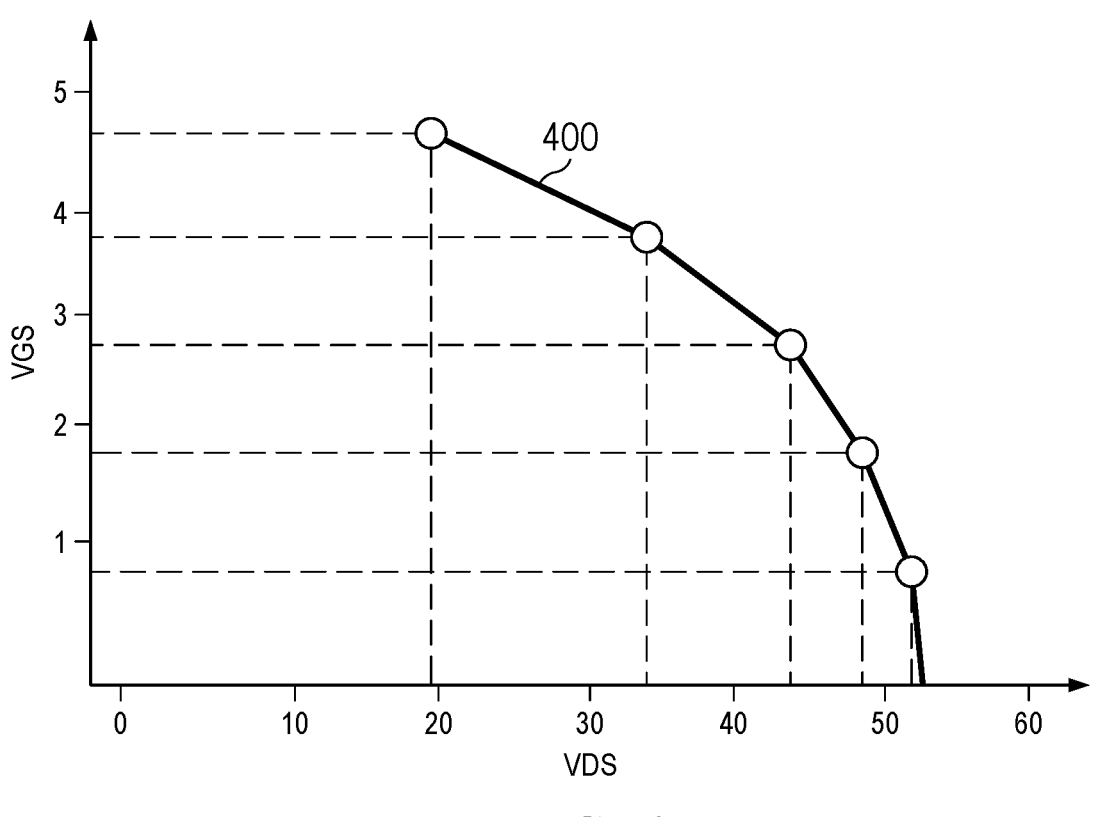
FIG. 4 is a diagram of an example safe operating area of the transistor of FIG. 3.

FIG. 4 is a diagram of an example safe operating area 400 of the drive transistor 235 of FIGS. 2 and 3. In the example of FIG. 4, the safe operating area 400 represents a maximum drain-to-source voltage of the transistor 235 at a given gate-to-source voltage of the first transistor 235. When the drain-to-source voltage of the drive transistor 235 is greater than a drain-to-source voltage of the safe operating arca 400 for a given gate-to-source voltage of the transistor 235, the excessive drain-to-source voltage of the drive transistor 235 damages the drive transistor 235.

Advantageously, the VGS clamp circuitry 250 of FIGS. 2 and 3 prevents the gate-to-source voltage of the drive transistor 235 from increasing, which reduces the maximum drain-to-source voltage from decreasing. Advantageously, the VGD clamp circuitry 255 of FIGS. 2 and 3 prevents the drain-to-source voltage of the drive transistor 235 from increasing beyond the maximum drain-to-source voltage at a given gate-to-source voltage. Advantageously, the clamp control circuitry 260 of FIGS. 2 and 3 prevents the gate-to-source voltage of the drive transistor 235 from increasing by enabling the third current source 354 of FIG. 3.

Figure 5:
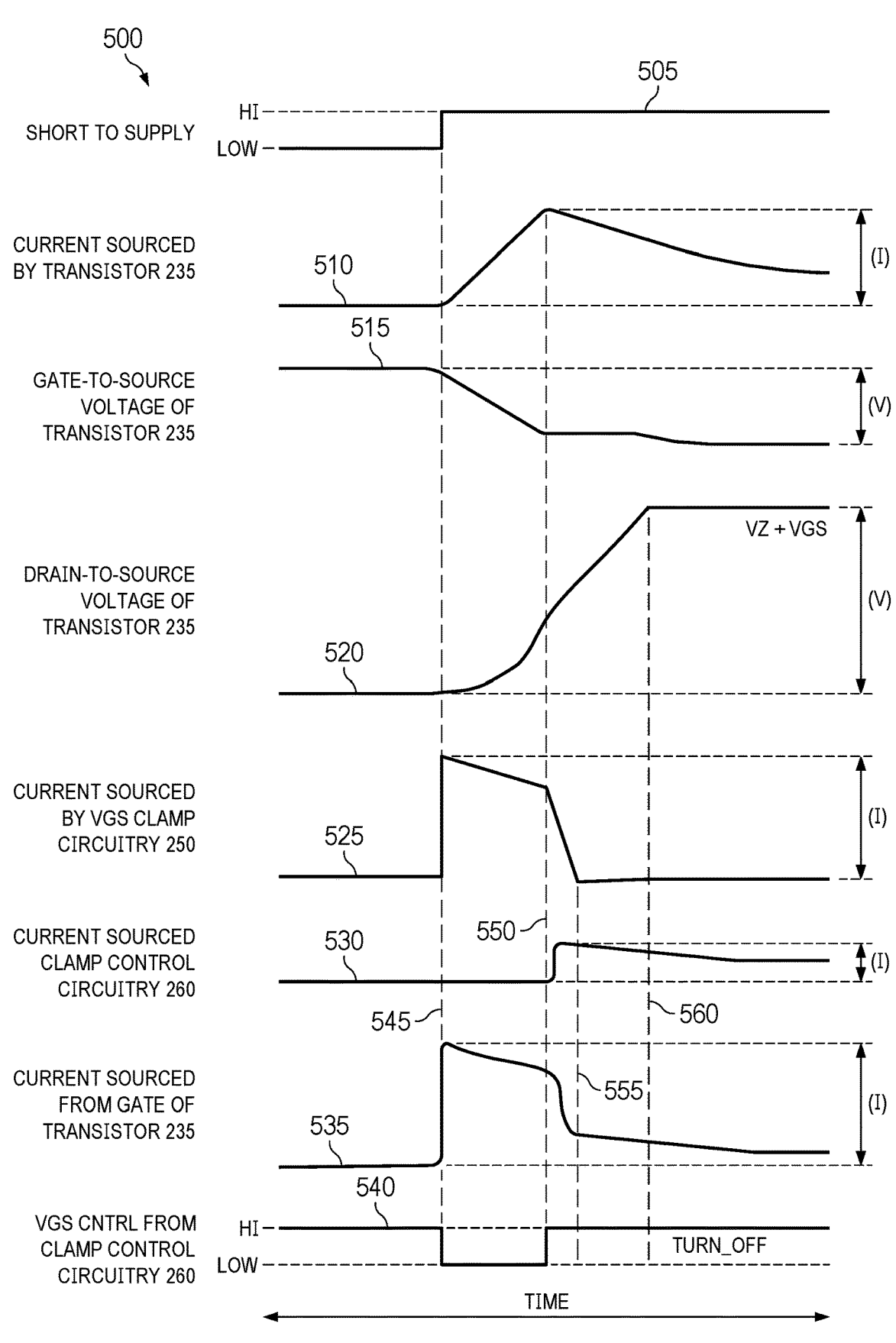
FIG. 5 is a timing diagram of an example operation of the low-side circuitry of FIGS. 2 and 3.

FIG. 5 is a timing diagram 500 of an example operation of the low-side circuitry 230 of FIGS. 2 and 3. In the example of FIG. 5, the timing diagram 500 illustrates an example short to supply signal 505, an example transistor current 510, an example gate-to-source voltage 515, an example drain-to-source voltage 520, an example VGS clamp gate current 525, an example clamp control gate current 530, an example total gate current 535, and an example VGS control signal 540. The timing diagram 500 illustrates operations of the circuitries 250-260 of FIGS. 2 and 3 to prevent the drive transistor 235 of FIGS. 2 and 3 from operating outside of the safe operating arca 400 of FIG. 4.

The short to supply signal 505 represents a signal from the first current sense circuitry 120. The first current sense circuitry 120 determines a current flowing through the first resistor 110. The first current sense circuitry 120 sets the short to supply signal 505 to a logic low (LOW) when the determined current is less than a short circuit current. In some examples, the first current sense circuitry 120 uses a threshold current as the short circuit current. In such examples, the first current sense circuitry 120 compares a determined current to the threshold current to detect a short circuit current. The first current sense circuitry 120 sets the short to supply signal 505 to a logic high (HI) when the current is determined to be a short circuit current. The first current sense circuitries 120 supplies the short to supply signal 505 to the first driver circuitry 125 of FIGS. 1 and 2. Alternatively, the short to supply signal 505 may represent a signal from the second current sense circuitry 150 of FIG. 1.

The transistor current 510 represents a current flowing from the drain terminal of the drive transistor 235 to the source terminal of the drive transistor 235. In some examples, the transistor current 510 is approximately equal to a current being sourced by the low-side circuitry 230.

The gate-to-source voltage 515 represents the gate-to-source voltage of the drive transistor 235. The gate-to-source voltage 515 is approximately equal to a voltage of the gate terminal of the drive transistor 235 minus a voltage of the source terminal of the drive transistor 235. In some examples, the gate-to-source voltage 515 is approximately equal to the voltage of the gate terminal of the transistor 235 when the source terminal of the drive transistor 235 is coupled to the common potential, such as in FIGS. 2 and 3.

The drain-to-source voltage 520 represents the drain-to-source voltage of the drive transistor 235. The drain-to-source voltage 520 is approximately equal to a voltage of the drain terminal of the drive transistor 235 minus a voltage of the source terminal of the drive transistor 235. In some examples, the drain-to-source voltage 520 is approximately equal to the voltage of the drain terminal of the drive transistor 235 when the source terminal of the drive transistor 235 is coupled to the common potential, such as in FIGS. 2 and 3.

The VGS clamp gate current 525 represents a current being sourced by the VGS clamp circuitry 250. The VGS clamp gate current 525 is approximately equal to a current being sourced by the ninth transistor 332 of FIG. 3. In some examples, the VGS clamp gate current 525 reduces a collection of excess charges on the gate terminal of the drive transistor 235 which allows the VGS clamp circuitry 250 to limit the gate-to-source voltage of the drive transistor 235.

The clamp control gate current 530 represents a current being sourced by the clamp control circuitry 260. The clamp control gate current 530 is approximately equal to a current being sourced by the third current source 354 of FIG. 3. In some examples, the clamp control gate current 530 reduces a collection of excess charges on the gate terminal of the drive transistor 235 and allows the VGD clamp circuitry 255 to limit the drain-to-source voltage of the drive transistor 235.

The total gate current 535 represents a current being sourced from the gate terminal of the drive transistor 235 by the circuitries 250 and 260. The total gate current 535 is approximately equal to a combination of the VGS clamp gate current 525 and the clamp control gate current 530.

The VGS control signal 540 represents the output of the logic gate 350 of FIG. 3. The VGS control signal 540 represents the output of the clamp control circuitry 260 that controls the VGS clamp circuitry 250. In example operation, the clamp control circuitry 260 sets the VGS control signal 540 to a logic low (LOW) to enable the VGS clamp circuitry 250. In such an example operation, the clamp control circuitry 260 sets the VGS control signal 540 to a logic high (HI) to disable the VGS clamp circuitry 250. The VGS control signal 540 turns on (e.g., conducting) the transistors 320 and 326 of FIG. 3 when set to a logic low. Also, the VGS control signal 540 turns off (e.g., non-conducting) the transistors 320 and 326 when set to a logic high.

At a first time 545, the short to supply signal 505 transitions from a logic low to a logic high representative of the current sense circuitries 120 and/or 150 detecting a short circuit current. At the first time 545, the transistor current

510 begins to increase in response to excess charge from firing the pyro switch 115 of FIGS. 1 and 2. At the first time 545, the SOA circuitry 245 of FIGS. 2 and 3 detects the increase in the transistor current 510 and supplies a logic low signal to the clamp control circuitry 260 to enable the VGS clamp circuitry 250. In example operation, the increase in the transistor current 510 turns on the transistors 304 and 310 of FIG. 3. At the first time 545, the VGS clamp gate current 525 increases and begins to source excess charges from the gate terminal of the drive transistor 235. As the VGS clamp circuitry 250 sources the excess charges, the gate-to-source voltage 515 begins to decrease towards a clamp voltage of the VGS clamp circuitry 250. Advantageously, the VGS clamp gate current 525 reduces the gate-to-source voltage of the drive transistor 235.

At a second time 550, the transistor current 510 and drain-to-source voltage 520 have increased enough to break down the Schottky diodes 334, 336, and/or 338 of FIG. 3, which disables the VGS clamp circuitry 250. At the second time 550, the VGD clamp circuitry 255 causes the clamp control circuitry 260 to disable the VGS clamp circuitry 250. Immediately following the second time 550, the VGS clamp gate current 525 and the total gate current 535 begin to decrease in response to disabling the VGS clamp circuitry 250. At the second time 550, the clamp control circuitry 260 enables the third current source 354 which increases the clamp control gate current 530.

At the second time 550, the VGS clamp circuitry 250 has sourced enough excess charge through the transistor 235 that the transistor current 510 begins to decrease and the gate-to-source voltage 515 remains set at the clamp voltage of the VGS clamp circuitry 250. Following the second time 550, a rate of increase of the drain-to-source voltage 520 decreases. At a third time 555, the VGS clamp gate current 525 has decreases to approximately zero and the clamp control gate current 530 is approximately equal to the total gate current 535. At the third time 555, the transistor current 510 continues to decrease as the excess charge from the pyro switch 115 continues to discharge through the transistor 235.

At a fourth time 560, all of the Schottky diodes 334, 336, and 338 have broken down and the VGD clamp circuitry 255 sets the gate-to-source voltage 520 equal to an addition of a clamp voltage and the gate-to-source voltage 515. Following the fourth time 560, the VGD clamp circuitry 255 continues to set the gate-to-source voltage 515 while the transistor 235 sources remaining excess charges from the pyro switch 115. Advantageously, the third current source 354 reduces an overshoot as the drain-to-source voltage 520 approaches the clamp voltage of the VGD clamp circuitry 255. Such a reduction in the overshoot reduces an increases in the drain-to-source voltage 520 from being greater than the safe operating area 400 allows.

Figure 6:
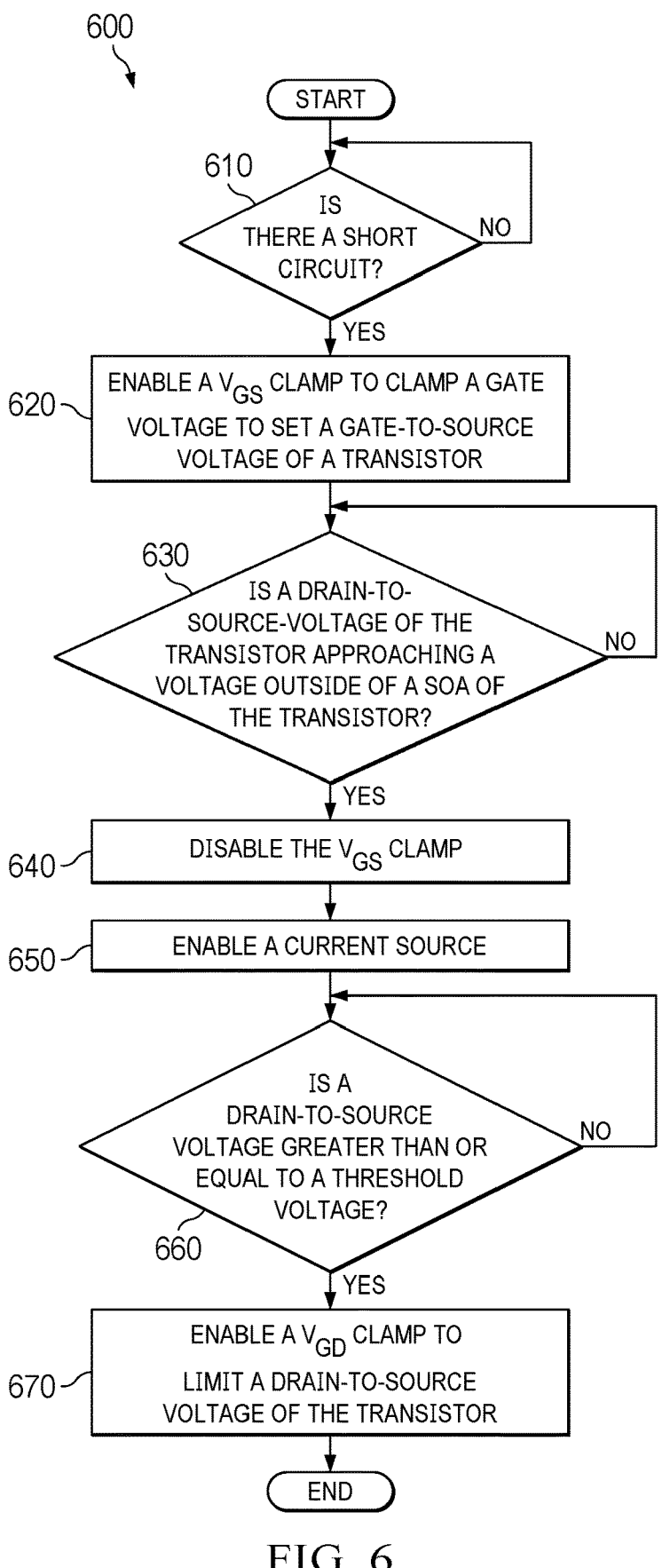
FIG. 6 is a flowchart representative of an example process that may be used to implement the clamp control circuitry of FIG. 3, and/or, more generally, the low-side circuitry of FIGS. 2 and 3.

FIG. 6 is a flowchart representative of example operations 600 that may be performed to implement the clamp control circuitry 260 of FIGS. 2 and 3, and/or, more generally, the low-side circuitry 230 of FIGS. 2 and 3. The example operations 600 of FIG. 6 begin at Block 610, wherein the SOA circuitry 245 of FIGS. 2 and 3 determine/detect if there is a short circuit. In some examples, the SOA circuitry 245 determines/detects there is a short circuit when the drain-to-source voltage of the drive transistor 235 of FIGS. 2 and 3 is approaching a voltage outside of the safe operating area 400 of FIG. 4.

If the SOA circuitry 245 does not determine/detect there is a short circuit (e.g., Block 610 returns a result of NO), control proceeds to return to Block 610. If the SOA circuitry 245 does determine/detect there is a short circuit (e.g., Block

610 returns a result of YES), the SOA circuitry 245 causes the clamp control circuitry 260 of FIGS. 2 and 3 to enable the VGS clamp circuitry 250 of FIGS. 2 and 3 to set the gate-to-source voltage of the transistor 235. (Block 620). In some examples, the drain-to-source voltage of the drive transistor 235 causes the SOA circuitry 245 to supply a logic low signal to the clamp control circuitry 260 by turning on the transistors 304 and 310 of FIG. 3. In such examples, the clamp control circuitry 260 turns on the transistors 320 and 326 of FIG. 3 responsive to the logic low signal from the SOA circuitry 245, which enable the VGS clamp circuitry 250.

The VGD clamp circuitry 255 determines/detects if the drain-to-source voltage of the drive transistor 235 is approaching a voltage outside of a safe operating area (e.g., the safe operating area 400) of the drive transistor 235. (Block 630). In some examples, the VGD clamp circuitry 255 determines/detects whether the drain-to-source voltage of the drive transistor 235 is approaching a voltage outside of the SOA of the drive transistor 235 using the Schottky diodes 334-338 of FIG. 3.

If the VGD clamp circuitry 255 determines/detects the drain-to-source voltage of the drive transistor 235 is not approaching a voltage outside of a safe operating area of the drive transistor 235 (e.g., Block 630 returns a result of NO), control proceeds to return to Block 630. If the VGD clamp circuitry 255 determines/detects the drain-to-source voltage of the transistor 235 is not approaching a voltage outside of a safe operating area of the drive transistor 235 (e.g., Block 630 returns a result of YES), the VGD clamp circuitry 255 causes the clamp control circuitry 260 to disable the VGS clamp circuitry 250. (Block 640). In some examples, the clamp control circuitry 260 disables the VGS clamp circuitry 250 by breaking down the first Schottky diode 334 responsive to the drain-to-source voltage of the drive transistor 235. In such examples, the comparator 348 of FIG. 3 supplies a logic high to the logic gate 350 of FIG. 3 to disable the VGS clamp circuitry 250 responsive to the drain-to-source voltage of the drive transistor 235 enabling the eleventh transistor 344 of FIG. 3.

The clamp control circuitry 260 enables the third current source 354 of FIG. 3. (Block 650). In some examples, the comparator 348 enables the third current source 354 responsive to the drain-to-source voltage of the drive transistor 235 breaking down the first Schottky diode 334. Advantageously, the third current source 354 continues to source current from the gate terminal of the drive transistor 235 after the VGS clamp circuitry 250 is disabled.

The VGD clamp circuitry 255 determines/detects if the drain-to-source voltage of the drive transistor 235 is greater than or equal to a threshold voltage created by the Schottky diodes 334-338. (Block 660). In some examples, the threshold voltage is approximately equal to an addition of the breakdown voltages of the Schottky diodes 334-338.

If the drain-to-source voltage of the drive transistor 235 is not greater than or equal to a threshold voltage created by the Schottky diodes 334-338 (e.g., Block 660 returns a result of NO), control proceeds to return to Block 660. If the drain-to-source voltage of the transistor 235 is greater than or equal to a threshold voltage created by the Schottky diodes 334-338 (e.g., Block 660 returns a result of YES), the VGD clamp circuitry 255 limits the drain-to-source voltage of the drive transistor 235. (Block 670). In some examples, the drain-to-source voltage of the drive transistor 235 breaks down all of the Schottky diodes 334-338 to limit the drain-to-source voltage of the drive transistor 235 to a voltage approximately equal to a combination of the breakdown voltage of the Schottky diodes 334-338 plus the gate-to-source voltage of the drive transistor 235. Control proceeds to end.

Although example processes are described with reference to the flowchart illustrated in FIG. 6, many other methods of implementing the circuitries 245-260 may alternatively be used in accordance with teachings of this disclosure. For example, the order of execution of the blocks may be changed, and/or some of the blocks described may be changed, eliminated, or combined. Similarly, additional operations may be included in the manufacturing process before, in between, or after the blocks shown in the illustrated examples.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

Numerical identifiers such as "first", "second", "third", etc. are used merely to distinguish between elements of substantially the same type in terms of structure and/or function. These identifiers as used in the detailed description do not necessarily align with those used in the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SIC), a gallium nitride substrate (GaN) or a gallium arsenide substrate (GaAs).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value, or, if the value is zero, a reasonable range of values around zero.

Modifications are possible in the described embodiments, and other embodiments are possible, within the scope of the claims.

What is claimed is:

1. An apparatus comprising:

a transistor having a source, a drain, and a gate;

first voltage clamp circuitry having a first terminal, a second terminal, and a third terminal, the first terminal of the first voltage clamp circuitry coupled to the source of the transistor, the second terminal of the first voltage clamp circuitry coupled to the gate of the transistor;

second voltage clamp circuitry having a first terminal, a second terminal, a third terminal, and a fourth terminal, the first terminal of the second voltage clamp circuitry coupled to the drain of the transistor, the second terminal of the second voltage clamp circuitry coupled to the gate of the transistor, the third terminal of the second voltage clamp circuitry coupled to the source of the transistor; and clamp control circuitry having a first terminal, a second terminal, a third terminal, and a fourth terminal, the first terminal of the clamp control circuitry coupled to the gate of the transistor, the second terminal of the clamp control circuitry coupled to the source of the transistor, the third terminal of the clamp control circuitry coupled to the third terminal of the first voltage clamp circuitry, the fourth terminal of the clamp control circuitry coupled to the fourth terminal of the second voltage clamp circuitry.

2. The apparatus of claim 1, wherein the transistor is a first transistor, and the first voltage clamp circuitry includes a second transistor having a source and a drain, the source of the second transistor coupled to the source of the first transistor, the drain of the second transistor coupled to the gate of the first transistor.

3. The apparatus of claim 1, wherein the second voltage clamp circuitry includes a Schottky diode having a first terminal and a second terminal, the first terminal of the Schottky diode coupled to the drain of the transistor, the second terminal of the Schottky diode coupled to the fourth terminal of the clamp control circuitry.

4. The apparatus of claim 1, wherein the clamp control circuitry includes a current source, an inverter, and a comparator, the current source having a first terminal, a second terminal, and a control terminal, the first terminal of the current source coupled to the gate of the transistor, the second terminal of the current source coupled to the source of the transistor, the control terminal of the current source coupled to the fourth terminal of the second voltage clamp circuitry by the inverter and comparator.

5. The apparatus of claim 1, wherein the clamp control circuitry further has a fifth terminal, the apparatus further comprising safe operating area (SOA) circuitry having a first terminal, a second terminal, a third terminal, and a fourth terminal, the first terminal of the SOA circuitry coupled to the drain of the transistor, the second terminal of the SOA circuitry coupled to the gate of the transistor, the third terminal of the SOA circuitry coupled to the source of the transistor, and the fourth terminal of the SOA circuitry coupled to the fifth terminal of the clamp control circuitry, the SOA circuitry configured to enable the first voltage clamp circuitry responsive to a drain-to-source voltage of the transistor.

6. The apparatus of claim 5, wherein the clamp control circuitry includes a comparator and a logic gate, the logic gate having a first input, a second input, and an output, the first input of the logic gate coupled to the fourth terminal of the SOA circuitry, the second input of the logic gate coupled to the fourth terminal of the second voltage clamp circuitry by the comparator, the output of the logic gate coupled to the third terminal of the first voltage clamp circuitry.

7. The apparatus of claim 5, wherein the transistor is a first transistor, and wherein the SOA circuitry includes:

a diode having a first terminal and a second terminal, the first terminal of the diode coupled to the drain of the first transistor;

a second transistor having a source, a drain, and a gate, the drain of the second transistor coupled to the second terminal of the diode, the gate of the second transistor coupled to the gate of the first transistor;

a third transistor having a source, a drain, and a gate, the source of the third transistor coupled to the source of the first transistor, the gate of the third transistor coupled to the source of the second transistor; and a buffer having a first terminal and a second terminal, the first terminal of the buffer coupled to the drain of the third transistor, the second terminal of the buffer coupled to the fifth terminal of the clamp control circuitry.

8. An apparatus comprising:

a first transistor having a first terminal, a second terminal, and a control terminal;

first clamp circuitry having a first terminal and a second terminal, the first terminal of the first clamp circuitry coupled to the control terminal of the first transistor;

second clamp circuitry having a first terminal, a second terminal, and a third terminal, the first terminal of the second clamp circuitry coupled to the first terminal of the first transistor, the second terminal of the second clamp circuitry coupled to the control terminal of the first transistor; and clamp control circuitry including:

a second transistor having a first terminal and a second terminal, the first terminal of the second transistor coupled to the third terminal of the second clamp circuitry;

a comparator having an input and an output, the input of the comparator coupled to the second terminal of the second transistor; and a logic gate including an input and an output, the input of the logic gate coupled to the output of the comparator, the output of the logic gate coupled to the second terminal of the first clamp circuitry.

9. The apparatus of claim 8, wherein the first clamp circuitry includes a third transistor having a first terminal and a second terminal, the first terminal of the third transistor coupled to the control terminal of the first transistor, the second terminal of the third transistor coupled to the second terminal of the first transistor.

10. The apparatus of claim 8, wherein the second clamp circuitry includes a Schottky diode having a first terminal and a second terminal, the first terminal of the Schottky diode coupled to the first terminal of the first transistor, the second terminal of the Schottky diode coupled to the first terminal of the second transistor.

11. The apparatus of claim 8, wherein the clamp control circuitry further includes:

an inverter having an input and an output, the input of the inverter coupled to the output of the comparator; and a current source having a first terminal, a second terminal, and a control terminal, the first terminal of the current source coupled to the control terminal of the first transistor, the second terminal of the current source coupled to the second terminal of the first transistor, the control terminal of the current source coupled to the output of the inverter.

12. The apparatus of claim 8, wherein the input of the logic gate is a first input, the apparatus further comprising safe operating area (SOA) circuitry having a first terminal, a second terminal, a third terminal, and a fourth terminal, the first terminal of the SOA circuitry coupled to the first terminal of the first transistor, the second terminal of the SOA circuitry coupled to the control terminal of the first transistor, the third terminal of the SOA circuitry coupled to the second terminal of the first transistor, and the fourth terminal of the SOA circuitry coupled to a second input of the logic gate, the SOA circuitry configured to enable the first clamp circuitry responsive to a drain-to-source voltage of the first transistor.

13. The apparatus of claim 12, wherein the logic gate is an OR gate.

14. The apparatus of claim 12, the SOA circuitry includes:

a diode having a first terminal and a second terminal, the first terminal of the diode coupled to the first terminal of the first transistor;

a third transistor having a first terminal, a second terminal, and a control terminal, the first terminal of the third transistor coupled to the second terminal of the diode, the control terminal of the third transistor coupled to the control terminal of the first transistor;

a fourth transistor having a first terminal, a second terminal, and a control terminal, the first terminal of the fourth transistor coupled to the second terminal of the first transistor, the control terminal of the fourth transistor coupled to the second terminal of the third transistor; and a buffer having a first terminal and a second terminal, the first terminal of the buffer coupled to the first terminal of the fourth transistor, the second terminal of the buffer coupled to the first input of the logic gate.

15. A system comprising:

a transistor having a first terminal, a second terminal, and a control terminal;

first clamp circuitry having a first terminal, a second terminal, and a third terminal, the first terminal of the first clamp circuitry coupled to the control terminal of the transistor, the second terminal of the first clamp circuitry coupled to the first terminal of the transistor;

second clamp circuitry having a first terminal, a second terminal, and a third terminal, the first terminal of the second clamp circuitry coupled to the second terminal of the transistor, the second terminal of the second clamp circuitry coupled to the control terminal of the transistor;

safe operating area (SOA) circuitry having a first terminal, a second terminal, and a third terminal, the first terminal of the SOA circuitry coupled to the second terminal of the transistor, the second terminal of the SOA circuitry coupled to the control terminal of the transistor, the SOA circuitry configured to enable the first clamp circuitry responsive to a drain-to-source voltage of the transistor; and clamp control circuitry having a first terminal, a second terminal, a third terminal, and a fourth terminal, the first terminal of the clamp control circuitry coupled to the control terminal of the transistor, the second terminal of the clamp control circuitry coupled to the third terminal of the first clamp circuitry, the third terminal of the clamp control circuitry coupled to the third terminal of the second clamp circuitry, the fourth terminal of the clamp control circuitry coupled to the third terminal of the SOA circuitry.

16. The system of claim 15, wherein the transistor is a first transistor, the first clamp circuitry including:

a second transistor having a first terminal, a second terminal, and a control terminal, the first terminal of the second transistor coupled to the control terminal of the second transistor;

a third transistor having a first terminal and a control terminal, the control terminal of the third transistor coupled to the first terminal of the second transistor and the control terminal of the second transistor; and a fourth transistor having a first terminal, a second terminal, and a control terminal, the first terminal of the fourth transistor coupled to the control terminal of the first transistor, the second terminal of the fourth transistor coupled to the second terminal of the second transistor, and the control terminal of the fourth transistor is coupled to the first terminal of the third transistor.

17. The system of claim 15, wherein the transistor is a first transistor, the second clamp circuitry including:

Schottky diode circuitry having a first terminal and a second terminal, the first terminal of the Schottky diode circuitry coupled to the second terminal of the first transistor, the Schottky diode circuitry including a plurality of Schottky diodes coupled in series; and a second transistor having a first terminal, a second terminal, and a control terminal, the first terminal of the second transistor coupled to the second terminal of the first transistor and the first terminal of the Schottky diode circuitry, the second terminal of the second transistor coupled to the control terminal of the first transistor, the control terminal of the second transistor coupled to the second terminal of the Schottky diode circuitry.

18. The system of claim 15, wherein the transistor is a first transistor, the clamp control circuitry including:

a second transistor having a first terminal and a second terminal, the first terminal of the second transistor coupled to the third terminal of the second clamp circuitry;

a comparator having an input and an output, the input of the comparator coupled to the second terminal of the second transistor;

a logic gate including an input and an output, the input of the logic gate coupled to the output of the comparator, the output of the logic gate coupled to the second terminal of the first clamp circuitry;

an inverter having an input and an output, the input of the inverter coupled to the output of the comparator; and a current source having a source terminal and a control terminal, the source terminal of the current source coupled to the control terminal of the first transistor, the control terminal of the current source coupled to the output of the inverter.

19. The system of claim 15, wherein the transistor is a first transistor, the SOA circuitry including:

a diode having a first terminal and a second terminal, the first terminal of the diode coupled to the second terminal of the first transistor;

a second transistor having a first terminal, a second terminal, and a control terminal, the first terminal of the second transistor coupled to the second terminal of the diode, the control terminal of the second transistor coupled to the control terminal of the first transistor;

a third transistor having a first terminal, a second terminal, and a control terminal, the first terminal of the third transistor coupled to the first terminal of the first transistor, the control terminal of the third transistor coupled to the second terminal of the second transistor; and a buffer having a first terminal and a second terminal, the first terminal of the buffer coupled to the first terminal of the third transistor, the second terminal of the buffer coupled to the clamp control circuitry.

20. The system of claim 15, further comprising:

a pyro switch coupled to the second terminal of the transistor; and driver circuitry coupled to the control terminal of the transistor.

* * * * *